United States Patent [19]

Panse et al.

[11] Patent Number: 4,707,775

[45] Date of Patent: Nov. 17, 1987

[54] FREE RUNNING CURRENT SUPPLY FOR A MONITOR

[75] Inventors: Hubert Panse; Wolfgang Schlegel, both of Munich, Fed. Rep. of Germany

[73] Assignee: Siemens Aktiengesellschaft, Berlin and Munich, Fed. Rep. of Germany

[21] Appl. No.: 904,641

[22] Filed: Sep. 8, 1986

[30] Foreign Application Priority Data

Sep. 27, 1985 [DE] Fed. Rep. of Germany ....... 3534532

[51] Int. Cl.$^4$ .............................................. H04N 5/63
[52] U.S. Cl. ...................................... 363/37; 315/411; 358/190; 363/21
[58] Field of Search ............................ 363/19, 21, 37; 315/408, 411; 358/190

[56] References Cited

U.S. PATENT DOCUMENTS

| 3,818,128 | 6/1974 | Chambers et al. | 358/190 |
| 4,079,418 | 3/1978 | Kupka et al. | 358/190 |
| 4,368,409 | 1/1983 | Sivanesan et al. | 315/411 |

FOREIGN PATENT DOCUMENTS

| 13529 | 1/1980 | Japan | 358/190 |
| 25772 | 2/1983 | Japan | 358/190 |
| 41372 | 3/1985 | Japan | 358/190 |

Primary Examiner—William H. Beha, Jr.
Attorney, Agent, or Firm—Hill, Van Santen, Steadman & Simpson

[57] ABSTRACT

In a free-oscillating converter for the current supply of a monitor, the switching frequency of an electronic switch is positioned midway between two consecutive multiples of the line frequency of the monitor, which obviates the necessity for a technically and financially expensive synchronization between switching frequency and line frequency. In the operating range of the converter, it is sufficient to adhere to the switching frequency with an accuracy of a few hundred Hz ($f_s \approx 1.5 + x) \cdot f_z$, where $x \in N_o$, $f_s$=switching frequency and $f_z$=line frequency.

3 Claims, 2 Drawing Figures

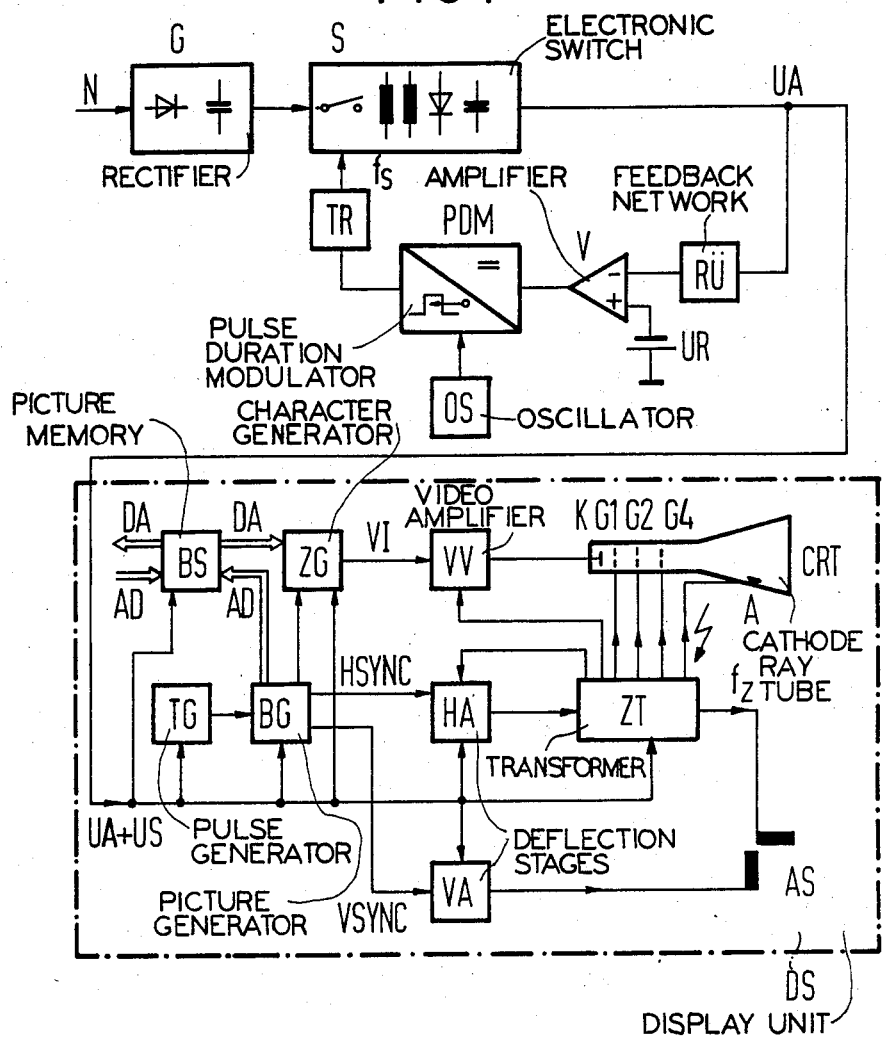

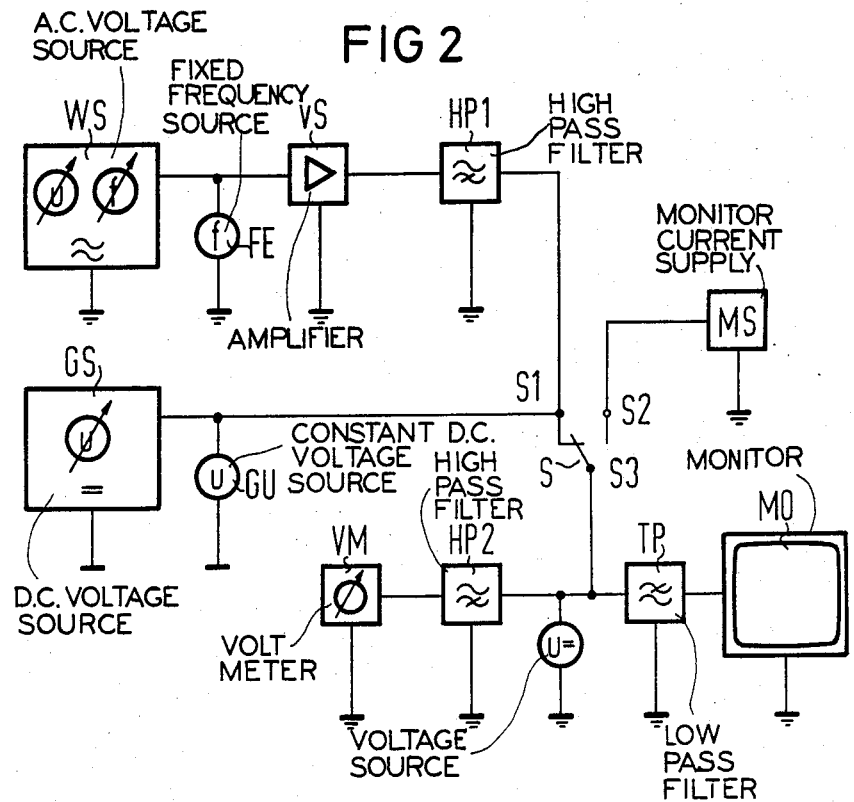

FREE RUNNING CURRENT SUPPLY FOR A MONITOR

BACKGROUND OF THE INVENTION

1. Field of the Invention

The present invention relates to a free oscillating current supply for a monitor for the screen of a communications terminal or the like, having a clock-controlled voltage converter which, from a commercial AC voltage supply, generates at least one DC voltage which is suitable for operation of the screen, and having a deflecting device assigned to the screen and having a predetermined line frequency.

2. Description of the Prior Art

In order to convert commercial AC voltage to DC voltages required for the operation of video display units, monitors and the like, it has been the practice for some time to use switched power supplies. Such switched power supplies combine the advantages of a very compact construction coupled with a high-level of control accuracy and efficiency.

The construction and operation of switched power supplies of this type are generally known and described in detail, for example, in the book "Switch-Mode Power Supply Units: Fundamentals Design, Circuitry Examples" by Joachim Wüstehube, published by the Expert Verlag, 1979.

In the switched power supply units, the commercial voltage is first rectified and filtered. The D.C. voltage obtained in this manner is fed to a regulated D.C. converter. An electronic switch, in combination with a transformer, secondary rectifier and filter circuit, and with a magnetic store and a charging capacitor, facilitates electrically-isolated transmission with low losses. The mean value of the output voltage can be influenced by periodically opening and closing the electronic switch and by changing the ratio of on time to period duration (pulse duty factor). When switched power supplies of this type are used for the current supply of monitors, interference between the current supply switching frequency and the line frequency of the monitor results in picture interference if the switching frequency is not precisely synchronized with the line frequency.

In addition, the pick up of magnetic fields of the transformer causes the electron beam to be modulated in intensity and the characters on the screen to change in brightness, resulting in flickering of the characters. In particular, in many applications the influence of ripples in the current supply produces problems in respect of the monitor picture. Small, superimposed interferences in the supply voltage become visible in the picture as flickering, strip formation or snow. Effects of this kind are disturbing to the observer and must be avoided in the interest of good picture quality.

A known solution is to synchronize the switching frequency of the converter with the line frequency of the monitor.

Therefore, the German allowed and published application No. 1,294,527 discloses a method of stabilizing a supply voltage for a load with its own clock frequency, using a switching transistor which serves as a control component in the series arm of the stabilizing circuit, a choke coil which serves as an energy store, and a diode which is arranged in the shunt arm and which has the reverse polarity to the operating voltage. Here, the switching transistor is controlled by a rectangular control voltage which has a constant period duration and a pulse duty factor which is dependent upon the output voltage to be stabilized, so that the frequency of the rectangular control voltage is automatically adjusted to the clock frequency or a whole numbered multiple of the clock frequency of the load as soon as the latter is switched on. A disadvantage of this method is that the clock frequency emitted from the load must first be prepared via a push-pull amplifier, which in turn contains two transformers, before it is supplied to a control component. These transformers entail increased costs, additional space requirements and a higher power loss of the overall switching regulator.

The German Pat. No. 25 27 112 also discloses a switched power supply for a video display unit (VDU) which contains an oscillator which is provided with a control input and the signals of which determine the switching frequency of the switched power supply. The VDU contains a clock pulse generator which generates clock pulses having a predetermined repetition frequency and a predetermined duration in order to construct a picture on the screen on the VDU. Here, the oscillator is connected via an isolating stage to the clock pulse generators so that the repetition frequency of the signals emitted from the oscillator is synchronized with the repetition frequency of the clock pulses emitted from the clock pulse generator. This avoids changes in timing both of the position and the brightness of the characters on the screen which occur in the event of slight differences between the repetition frequency of the clock pulses and the switching frequency of the switching transistor as a result of beating.

This method of synchronizing the line frequency of the monitor with the switching frequency of the clock-controlled monitor current supply has the disadvantage that the expense in terms of components and the associated costs are relatively-high. Therefore, the clock pulse generator must additionally contain a frequency divider which, from the signals for constructing a picture on the screen, produces clock pulses for synchronizing the power supply unit. Apart from the oscillator, an additional isolating stage is required, e.g. an optical coupling element or transformer.

This is technically and financially expensive as a method of achieving synchronization between the switching frequency of the converter and the line frequency of the monitor rules out the possibility of using cost-effective, free oscillating converters.

SUMMARY OF THE INVENTION

The object of the present invention is to provide a current supply device for a screen of a communications terminal with which the influence of ripples in the current supply upon the picture quality is minimized without synchronization between the switching frequency of the current supply and the line frequency of the screen.

The above object is achieved in a current supply for the screen of a communications terminal or the like, with a clock-controlled voltage converter which, from a commercial A.C. voltage, generates at least one D.C. voltage which is suitable for the operation of the screen, and with a deflecting device, assigned to the screen, with a predetermined frequency, and is particularly characterized in that the switching frequency of the electronic switch which clock controls the voltage converter is midway between two consecutive multiples of the line frequency of the screen.

The advantage of the present invention is that by selecting the switching frequency of the electronic switch for the current supply midway between two consecutive multiples of the line frequency of the monitor, cost-effective, free-oscillating converters can be used for the current supply of the monitor. In the operating range it is sufficient to adhere to the switching frequency with an accuracy of a few 100 Hz.

In order to provide individual values of the interference limit for each monitor, it is necessary to determine the permissible voltage ripples for monitors. As a result, the requirements of a monitor current supply can be specified in such detail that synchronization of the frequencies becomes unnecessary and the use of cost-favorable, free-oscillating converters of the monitor current supply is advantageous.

One cause of picture interference lies in the amplitude and frequency of the output A.C. voltage generated by the switching regulator. This is difficult to measure using an oscillograph as it is modulated by the amplitude and frequency of the picture A.C. voltage. In order to make a statement on the influence of this possible cause of picture interference, it is necessary to carry out a spectral measurement of the voltage ripple. As the input impedance of the monitor generally has a low-pass filter characteristic, here it is sufficient to investigate only the amplitude of the fundamental wave; in order to obtain a relative comparison criterion and suppress interferences which are input-coupled via lines it is necessary to terminate the measuring station on the monitor with a determinate low-pass filter.

BRIEF DESCRIPTION OF THE DRAWINGS

Other objects, features and advantages of the invention, its organization, construction and operation will be best understood from the following detailed description, taken in conjunction with the accompanying drawing, on which:

FIG. 1 is a schematic representation of a video display unit with the associated current supply device; and FIG. 2 is a schematic representation of a measuring unit for determining the most favorable switching frequency of the current supply device.

DESCRIPTION OF THE PREFERRED EMBODIMENTS

The commercial AC voltage N is rectified and filtered with the aid of a rectifier G. The DC voltage obtained therefrom is fed to an electronic switch S which is controlled by a pulse-duration modulator PDM. The rectangular voltage obtained by chopping is transformed by a transformer and is then rectified and filtered. The output voltage UA is stabilized by a regulator which influences the pulse duty factor of the switching process. For this purpose, the output voltage UA is fed by way of a feedback network RÜ and is compared with a fixed reference voltage UR. Here, the output voltage UA is connected to the inverting input of a regulating amplifier V, whereas the reference voltage UR is connected to the noninverting input of the regulating amplifier V. The output signal from the regulating amplifier V, the deviation, is fed together with a sawtooth voltage (or triangular voltage) of an oscillator OS to the pulse duration modulator PDM which produces therefrom a rectangular signal having the oscillator frequency, the pulse duty factor of which is dependent upon the deviation. A driver TR controls the electronic switch S.

The output voltage UA, upon which an interference voltage US can be superimposed, is fed to the visual display unit DS. By cyclically applying an address AD, a picture generator BG causes the picture memory BS to transfer the data DA, which is to be displayed, to a character generator ZG. Here, the data DA is transmitted either character-wise in a direct manner or block-wise (line-wise in a buffered manner) so that a device control (not shown) can make use of the gaps which remain between these accesses in order to change the picture. In the character generator ZG, the operating speed, which is likewise predetermined by the picture generator BG and the quartz crystal-controlled clock pulse generator TG, the coded characters are converted for the video amplifier VV. The picture generator also produces the synchronizing signals HSYNC and VSYNC for the horizontal deflection stage HA and the vertical deflection stage VA. It also causes the character generator ZG to display a cursor on the screen of the cathode ray tube CRT. The screen of the cathode ray tube CRT converts electrical signals into optical signals. It has three inputs for video signal VI, horizontal synchronizing signal HSYNC, and the vertical synchronizing signal VSYNC and one input for the supply voltage UA. The relatively high voltages and currents for the modulation and deflection of the high-energy electron beam are generated in the video amplifier VV and in the two deflection stages HA and VA.

Each of the two deflection stages HA and VA fundamentally consist of an oscillator component and a power component. The free-running oscillators are locked to the correct frequency by the synchronizing signals HSYNC and VSYNC. The end stages of the power component drive the sawtooth currents, the magnitude of which amounts to several amperes, through the two deflecting coils AS in order to produce the writing trace.

The video amplifier VV converts the signal VI, emanating from the character generator ZG, into a control voltage, which serves to control the beam current, for the cathode K and the grid G1. Like the other electrodes G2, G4 and A of the cathode ray tube CRT, it obtains its supply voltage from a line transformer ZT.

If a free-running, non-synchronized switching power supply unit is used to supply the current for such a monitor and if the switching frequency of the electronic switch is midway between two consecutive multiples of the line frequency of the monitor, no impairment of the picture quality occurs.

Measurement of the spectrum of the maximum permissible voltage ripple of the monitor current supply has indicated that the signal-to-noise ratio is the greatest either with exact synchronization between the current supply switching frequency and the line frequency or when the switching frequency is selected midway between two consecutive multiples of the line frequency. The associated mathematical expression is:

$$f_s \approx (1.5+x) \cdot f_z \text{ with } X \in N_o,$$

where, $f_s$ = switching frequency of the electronic switch,
$f_z$ = line frequency of the monitor, and
x = element of the natural numbers.

x can be any positive whole number including the number zero. This set of positive whole numbers 0, 1, 2, 3, 4, 5, 6, . . . there is also described as a set of natural numbers including "zero" and is abbreviated by the mathematical symbol $N$.

For a typical line frequency of a monitor of 20 kHz, it follows that a value of 30 kHz, 50 kHz, 70 kHz, etc., can be selected for the switching frequency of the electronic switch without picture interference occurring on the monitor.

The mentioned frequencies can be produced by suitable dimensioning of the components of the free-oscillating converter.

The upper limit value of the switching frequency selected in accordance with the above relationship is fundamentally governed by the properties of the electronic switch, and in particular the switch-over times, which reduce with increasing frequency, govern the optimization of the very large number of details, such as a more powerful drive of the electronic switch.

In the following, a measuring unit will be described which permits the specification of the non-critical switching frequencies for a monitor with a predetermined line frequency.

The measuring circuit, as is illustrated in FIG. 2, comprises a DC voltage source, which is modifiable in respect of all basic parameters, with a sinusoidal AC component. For this purpose, an AC voltage source WS, which can be varied in amplitude and frequency, and in parallel therewith a fixed frequency source FE are connected by way of an amplifier VS and a high pass filter HP1 to a terminal S1 of a transfer switch S. A DC voltage source GS, which can be varied in magnitude, and connected in parallel therewith a constant DC voltage source GU are likewise connected to the terminal S1. The other terminal S2 of the tranfer switch S is connected to a monitor current supply MS, the switching frequency of which is to be fixed. The input of the monitor MO is preceded by a low-pass filter TP which is connected to a terminal S3 of the transfer switch S. A selective volt meter VM is connected in parallel therewith via a high-pass filter HP2 which serves to decouple the DC voltage.

First of all, the monitor current supply MS is connected to the monitor MO via the switch S. The frequency and magnitude of the first fundamental wave can be accurately determined by the selective volt meter VM. The DC component of the voltage is likewise measured. When the switch S has been reversed, the measured values can be reproduced on the appropriate devices. Now the amplitude of the AC voltage WS is increased until a visible picture interference occurs. Now the amplitude is reduced again until the established effect can no longer be observed. The difference between the measured amplitude values of this measurement and the measurement with the current supply MS represents the signal-to-noise ratio of the current supply MS. If the switching frequency of the converter can fluctuate as a result of component tolerances, it is necessary to measure through the entire frequency tolerance range, as described above, to reduce the amplitude. In order to determine the noncritical zones for the switching frequency of the converter, the zone between the fundamental wave and the first harmonic of the line frequency is divided into an arbitrary number of subsections and a maximum permissible voltage is determined for each frequency. The switching frequency of the converter is then positioned in the noncritical zone, and a safety margin for the amplitude is fixed with suitable discretion.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a current supply device of the type for supplying the screen of a communications terminal, having a clock-controlled voltage converter which, from a commercial AC voltage supply, generates at least one DC voltage which is suitable for operation of the screen, and of the type having a deflecting device operatively associated with the screen with a predetermined line frequency, the improvement therein comprising:
    an electronic switch for controlling the voltage converter; and
    means for providing the electronic switch with a switching frequency which is midway between two consecutive multiples of the line frequency of the screen.

2. The improved current supply device of claim 1, wherein:
    the clock-controlled voltage converter is a free-oscillating switch-mode power supply unit.

3. The improved current supply device of claim 1, and further comprising:
    means for providing an accuracy of a few hundred Hertz of the switching frequency of the electronic switch in the operating range.

* * * * *